July 11, 1961 S. T. TONEY 2,992,297

DEVICES USED TO REMOVE KINKS AND TWISTS FROM CORDS OF TELEPHONE HANDSETS

Filed May 28, 1957

INVENTOR.
SETH T. TONEY
BY
Carl Miller
ATTORNEY 2,992,297

DEVICES USED TO REMOVE KINKS AND TWISTS FROM CORDS OF TELEPHONE HANDSETS

Seth T. Toney, 10542 Pace Ave., Los Angeles 2, Calif.

Filed May 28, 1957, Ser. No. 662,184
2 Claims. (Cl. 179—178)

This invention relates in general, to an independent, unattached, swivel-suspended device, of rigid, flexible, pliant, or thoroughly collapsible materials suitable to its construction, for use particularly in the straightening of the long cords to telephone handsets, when such cords have become twisted, or kinked. Other and similar uses in which this invention may be utilized are conceivably included, but the phone cord use is basic.

The object of the invention is to furnish a means by which the telephone cords thus twisted and kinked may be quickly freed of these knots, twists and kinks, without involving the mechanism of the phone itself, and thus not disturbing the normal functioning of the telephone in any way whatsoever.

Another object of the invention is to provide a dekinking device which cannot possibly interfere with the normal operation of the microphonic functioning of the telephone handset, by virtue of the fact that it is constructed in a completely separate unit.

A further object is to produce a telephone de-kinking device which is simple, adapted to low manufacturing cost and consequently to low consumer cost, yet infinitely durable and requiring no special care.

To obtain these and other objects, and in accordance with the features of the invention, a swivel, basket-like device, with an eye or hook bolt, or any suitable supporting member whose lower end forms a swivel at its secured junction with a rotary member, which in turn supports by rods, cords or other suitable material, a base, stiff or pliant, suited to receive and securely contain the telephone handset, is provided. By use of the swivel suspension thus provided in the invention, the telephone handset is free to be rotated in either direction required in the de-kinking of the phone cord. The untwisting process may be completed very quickly in this way, and without any functional disturbance to the telephone handset itself.

With these and other objects and advantages in view, the invention consists of the new and novel combination, construction, and arrangement of parts as hereinafter more fully described, set forth in the claims appended hereto, and disclosed in the accompanying drawings forming a part hereof, wherein:

Figures 1, 2, 5:
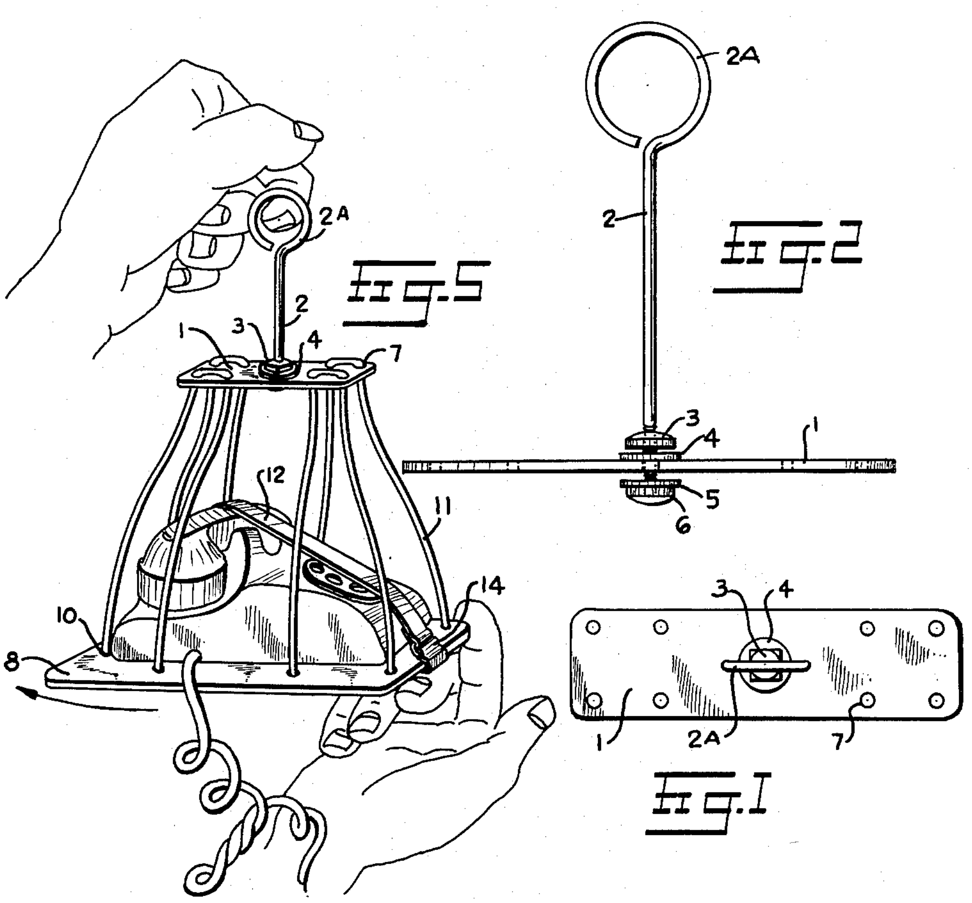
FIG. 1 is a plan view showing a basic type of the swivel and supporting assembly of the invention, as seen from above.
FIG. 2 is a plan view showing a basic type of the swivel and supporting assembly as seen from a relatively horizontal position.
FIG. 5 is a side view showing a basic type of the completed invention, showing telephone handset in place, with the de-kinking rotation in progress, as indicated by arrow, in illustration. Again, it is conceived that shape, rigidity, and materials may vary with the manufacturer's preference.
Figure 3:
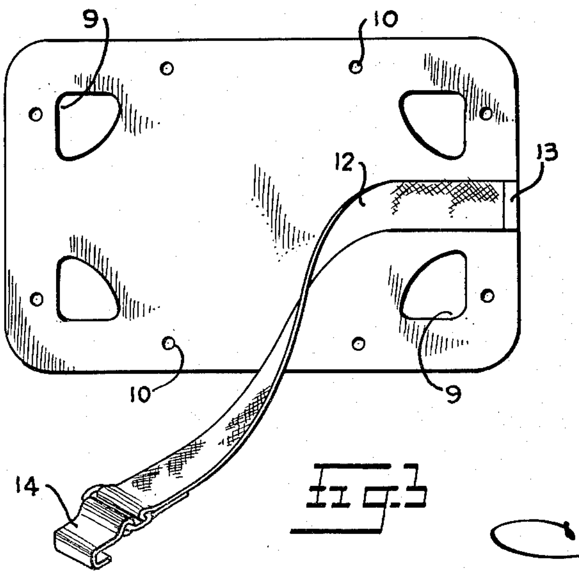
FIG. 3 is a plan view showing a basic type of the base of the invention as seen from above.
Figure 4:
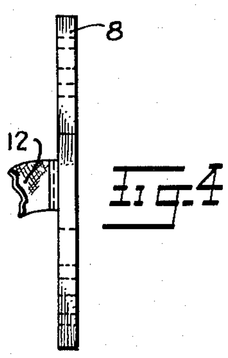
FIG. 4 is a plan view showing a basic type of the base as seen from a relatively horizontal position.

Referring more particularly to FIGURES 1 and 2 of the drawings, said drawings being basic, conceptually, eye 2A of bolt 2 is provided for insertion of the finger, a dowel, hook or any suitable means of support, while the invention is being used. Lower end of eye bolt 2 extends through nut 3, washer 4, swivel plate or swivel member 1, washer 5, and supporting nut 6, to which lower end of bolt is secured by spreading, braiding or welding, so as to prevent nut 6 from rotating with washer 5 and swivel plate or swivel member.

Although shown as separated, in FIG. 2, so as to more clearly identify each part, parts 3, 4, 1, 5, and 6 are conceivably adjusted toward each other so as to form a compact swivel unit, indicating the use of a proper lubricant between the surfaces of these parts. It is also conceivably understood that, with added complications and expense, this swivel could include ball, roller or tapered bearings, bushing, reversible ratchet, friction break, and other mechanical elaborations. This simple swivel is offered in the interest of economy all along the line from production to consumer.

Swivel plate or swivel member 1, made of suitable material, is shown as rigid and rectangular, but may be made of hard or pliant material and in many different shapes. Said swivel plate or swivel member is provided with perforations 7, to receive flexible cord or other suitable material, which cord or material extends through performations 10 in base 8, with perforations 7 and 10 matching in number, and with base 8 being made of stiff, pliant, or soft material as preferred by producers and others.

It is conceptually understood that other means of attaching the cord or other supporting material to swivel member and base, such as screw eyes, welds, plastic hot molds, glue, self-material, and others are available to manufacturers.

The base 8, made of plywood, plastic, sheet metal, aluminum, or other more soft or pliant materials, is provided, basically, with perforations 10 to receive supporting cords or other material, and larger perforations or depressions 9 so shaped as to provide anchorage and security by snugly pocketing the under-pinnings and bottom contours of the base of the telephone handset. Double security is provided through safety strap 12, secured at one end 13, passed over the telephone handset and hooked over the opposite end of the base by hard clip-hook 14, itself made of suitable material. This strap secures the speaker-receiver and its cord within the swivel basket, during the brief de-kinking rotation process.

I have thus conceived, had drawn, and constructed a model of my invention, the swivel cord de-kinker, which provides an inexpensive means of quickly eliminating the unsightly twists and kinks, which accumulate so readily in the otherwise convenient and serviceable long cords of our household telephone handsets. This device is a useful and desirable household article, expressly desired by all long cord telephone handset subscribers who have seen the working model in operation, low in cost and maintenance, durable in use and, because of its separate construction from the telephone, cannot possibly interfere with the normal functioning of the handsets.

What is claimed is:

1. A device for removing kinks and twists from cords from telephone handsets comprising, in combination, a base plate, means for securing a telephone handset to one top side of said base plate, a suspension bracket, a plurality of flexible lines extending between said suspension plate and said base plate, and a handle extending upwardly from and rotatably supporting said suspension plate, whereby an external force applied to base plate is operative to effect rotation of said suspension plate and the telephone handset carried thereby relative to said handle, said suspension plate comprising a swivel plate, said base plate comprising a rectangular plate of substantially larger size than said swivel plate, and said means for securing said telephone handset upon said base plate comprising a flexible strap secured at one end to one end of said base plate, a releasable clip hook at the opposite end of said flexible strap for releasable engagement with a spaced apart portion of said base plate, and said strap releasably securing a telephone handset upon the upper surface of said base plate.

2. A device for removing kinks and twists from cords of telephone hand sets as set forth in claim 1, wherein said handle includes an elongated shaft rotatably secured at one end to said swivel plate, and an eye at the opposite end of said shaft for receiving a finger therethrough for supporting said device in vertically spaced relationship with a supporting surface.

References Cited in the file of this patent

UNITED STATES PATENTS

| | | |
|---|---|---|
| 2,614,838 | Taylor | Oct. 28, 1952 |
| 2,647,959 | Mahoney | Aug. 4, 1953 |
| 2,799,244 | Dorsey | July 16, 1957 |